US010473265B2

(12) United States Patent
Banes et al.

(10) Patent No.: US 10,473,265 B2
(45) Date of Patent: Nov. 12, 2019

(54) LOOP STRAP

(71) Applicant: Sellmark Corporation, Mansfield, TX (US)

(72) Inventors: Matthew Banes, Sachse, TX (US); Garrett Hellinger, Sachse, TX (US); Gabriel James Snyder, Sachse, TX (US)

(73) Assignee: Sellmark Corporation, Mansfield, TX (US)

( * ) Notice: Subject to any disclaimer, the term of this patent is extended or adjusted under 35 U.S.C. 154(b) by 0 days.

(21) Appl. No.: 15/971,668

(22) Filed: May 4, 2018

(65) Prior Publication Data

US 2018/0320819 A1  Nov. 8, 2018

Related U.S. Application Data

(60) Provisional application No. 62/502,949, filed on May 8, 2017.

(51) Int. Cl.
F16M 13/04 (2006.01)
A01M 31/02 (2006.01)
F41A 23/12 (2006.01)
F16M 11/32 (2006.01)

(52) U.S. Cl.
CPC ............ F16M 13/04 (2013.01); A01M 31/02 (2013.01); F41A 23/12 (2013.01); F16M 11/32 (2013.01)

(58) Field of Classification Search
CPC ......... F16M 13/04; A01M 31/02; F41A 23/12
See application file for complete search history.

(56) References Cited

U.S. PATENT DOCUMENTS

| 3,016,802 A | * | 1/1962 | Grunenberg | F41A 23/12 248/186.2 |
| 4,155,636 A | * | 5/1979 | Reeberg | A45F 5/00 24/302 |
| 4,266,867 A | * | 5/1981 | Reeberg | A45F 5/00 24/302 |
| 5,056,253 A | * | 10/1991 | Willumsen | F41C 27/22 42/94 |
| 5,738,328 A | * | 4/1998 | O'Farrill | F16M 13/04 24/170 |
| 5,794,899 A | * | 8/1998 | Tamllos | F41A 23/12 248/166 |

(Continued)

Primary Examiner — Anita M King
(74) Attorney, Agent, or Firm — Scott L. Harper; Smitha Mathews

(57) ABSTRACT

The present disclosure relates to apparatus and methods for stabilizing tripod shooting platforms. An apparatus according to the present disclosure may comprise a loop strap having a securing means for attaching the loop strap to a tripod shooting platform, an adjustment means for adjusting the length of the loop strap, and a loop for engaging a user's foot and creating tension in the loop strap, thereby generating a compressive stabilizing force on the tripod shooting platform. A method of stabilizing a tripod shooting platform according to the present disclosure may comprise the steps of securing a first end of a loop strap to the tripod shooting platform, adjusting the length of the loop strap, and pulling down on a second end of the loop strap to create tension in the loop strap, thereby generating a stabilizing force on the tripod shooting platform.

16 Claims, 2 Drawing Sheets

(56) References Cited

U.S. PATENT DOCUMENTS

| | | | | |
|---|---|---|---|---|
| 6,964,277 B2* | 11/2005 | Naber | ............... | A45B 25/00 |
| | | | | 135/117 |
| 7,207,118 B2* | 4/2007 | Watters | ............ | A45C 13/30 |
| | | | | 33/290 |
| 8,960,211 B2* | 2/2015 | Eng | ................... | A45B 1/00 |
| | | | | 135/66 |
| 9,151,562 B1* | 10/2015 | Pugliese | ............ | F41A 23/14 |
| 9,816,777 B2* | 11/2017 | Wilkinson | ......... | F41C 33/002 |
| 2013/0101277 A1* | 4/2013 | Barreiro | ............ | F16M 13/04 |
| | | | | 396/55 |
| 2015/0053145 A1* | 2/2015 | Miksovsky | ....... | A01K 27/003 |
| | | | | 119/772 |
| 2018/0135934 A1* | 5/2018 | Knutson | ............ | F41A 23/12 |

* cited by examiner

LOOP STRAP

CROSS-REFERENCE TO RELATED APPLICATIONS

This application claims the benefit of, and priority to, U.S. Provisional Patent Application Ser. No. 62/502,949, filed on May 8, 2017 and entitled "Loop Strap", the content of which is incorporated herein by reference for all purposes.

BACKGROUND

Long-range rifle shooting typically requires the use of a support structure to hold and steady the rifle. Because rifle shooters may desire to fire on uneven terrain, from varying positions, or from various locations, tripods may commonly be used to steady long-range rifles.

One disadvantage of conventional tripod shooting platforms is their inherent movement when a user prepares to fire. This is largely related to the flexibility in the legs of the tripod. Additionally, the recoil, or the backward movement of the rifle in response to the forward momentum of the projectile, also destabilizes the tripod platform. The instability of the tripod may compromise the stability of the shooter's platform, thus resulting in decreased accuracy.

SUMMARY

The present disclosure relates to apparatus and methods for stabilizing tripod shooting platforms.

In some implementations, the apparatus according to the present disclosure may comprise a loop strap having a securing means for attaching the loop strap to a tripod shooting platform, an adjustment means for adjusting the length of the loop strap, and a loop for engaging a user's foot and creating tension in the loop strap, thereby generating a compressive stabilizing force on the tripod shooting platform. The loop strap may further comprise a D-ring for attaching the loop strap to a rifle sling, thereby further stabilizing the rifle on the tripod shooting platform.

In other implementations, the method of stabilizing a tripod shooting platform according to the present disclosure may comprise the steps of securing a first end of a loop strap to the tripod shooting platform, adjusting the length of the loop strap, and pulling down on a second end of the loop strap to create tension in the loop strap, thereby generating a stabilizing force on the tripod shooting platform. The method may further comprise securing a third end of the loop strap to a rifle sling, thereby further stabilizing the rifle on the tripod shooting platform.

The details of one or more implementations are set forth in the accompanying drawings and the description below. Other features, objects, and advantages of the implementations will be apparent from the description and drawings.

BRIEF DESCRIPTION OF THE DRAWINGS

For a more complete understanding of this disclosure and its features, reference is now made to the following description, taken in conjunction with the accompanying drawing, in which.

DETAILED DESCRIPTION

Embodiments of the present disclosure generally provide apparatus and methods relating to stabilizing tripod shooting platforms. The apparatus, a loop strap, and method of stabilizing tripod shooting platforms therewith may comprise a plurality of different features and components as described herein.

Long-range rifle shooting typically requires the use of a support structure to hold and steady the rifle. The earliest forms of supports included sandbags (for prone-positioned shooting) or trees or other platforms (for upright-positioned shooting). However, because shooters may desire to fire on uneven terrain, from varying positions, or from various locations, tripods are commonly used to steady long-range rifles. A tripod shooting platform allows for versatility with its adjustable height, its independently extendable legs to accommodate uneven surfaces, and its lightweight and transportable structure.

Despite its many advantages, however, one main disadvantage of any tripod shooting platform is its inherent movement when a user prepares to fire. This is largely related to the flexibility in the legs of the tripod. Additionally, the recoil, or the backward movement of the rifle in response to the forward momentum of the projectile, also destabilizes the tripod platform. The instability of the tripod may compromise the stability of the shooter's platform, thus resulting in decreased accuracy. Prior art mechanisms have attempted to address these issues by securing the tripod platform using the rifle's own sling or a weighted tripod strap. However, these mechanisms cannot be regulated by the user when he/she is in firing position without detrimental changes to the shooter's position. Thus, there is a need to provide a tripod shooting accessory which reduces movement and stabilizes the shooting platform, and which may be controlled by a user while maintaining a proper shooting stance.

Figure 1:
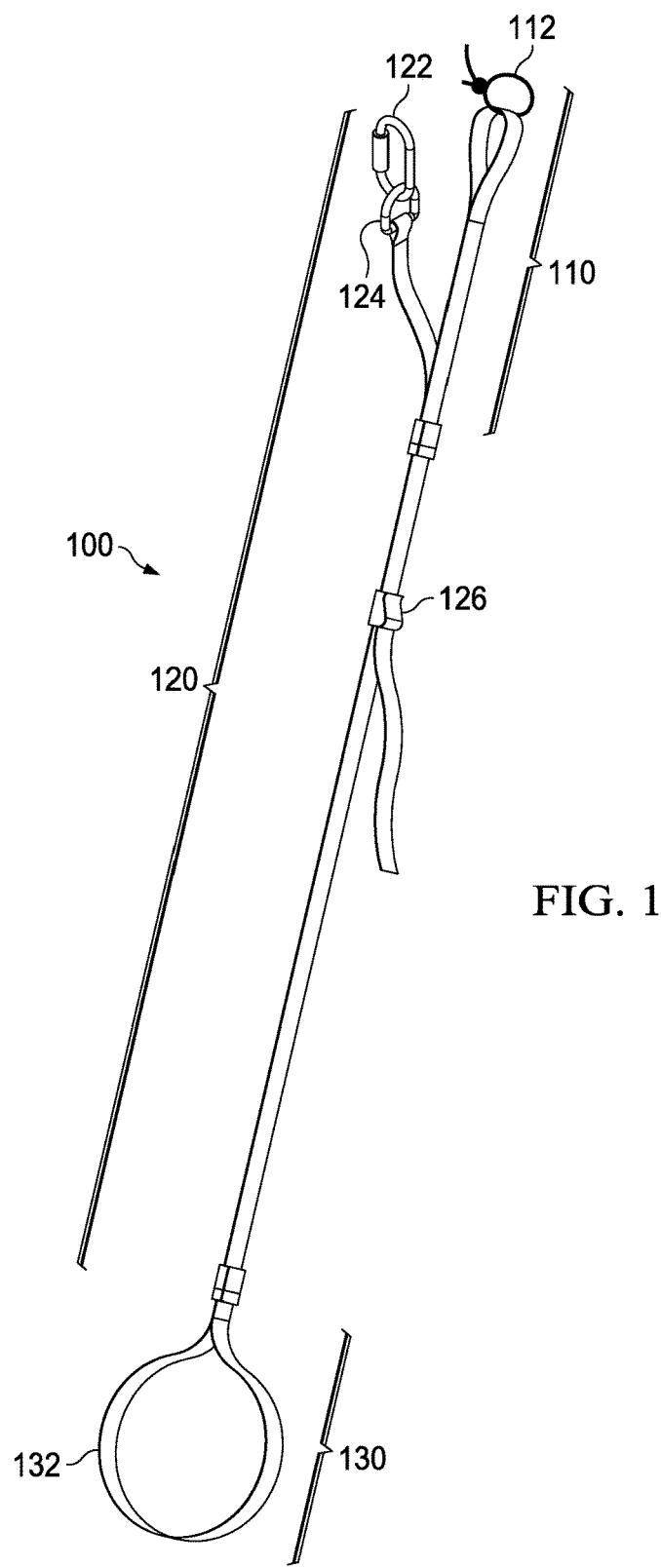
FIG. 1 illustrates a loop strap according to the present disclosure.

FIG. 1 depicts loop strap 100 according to an embodiment of the present disclosure. Loop strap 100 comprises an upper portion 110, a middle portion 120, and lower portion 130. The upper portion 110 of loop strap 100 comprises a securing means 112 for securing the loop strap 100 to a center or base of the tripod platform shown in FIG. 2. While FIG. 1 depicts securing means 112 as a tying mechanism, it may be noted that securing means 112 may comprise any manner of securing known in the art, including, but not limited to VELCRO (hook-and-loop fastener) straps, snap closures, etc.

With continued reference to FIG. 1, the middle portion 120 of the loop strap 100 comprises a D-ring 124, carabiner 122, and cam buckle 126. Positioned above cam buckle 126, D-ring 124 may attach to a sling of rifle 300 via carabiner 122. Cam buckle 126 allows for adjustment of the overall length of the loop strap 100. The lower portion 130 of the loop strap 100 is positioned below cam buckle 126 and comprises loop 132.

Figure 2:
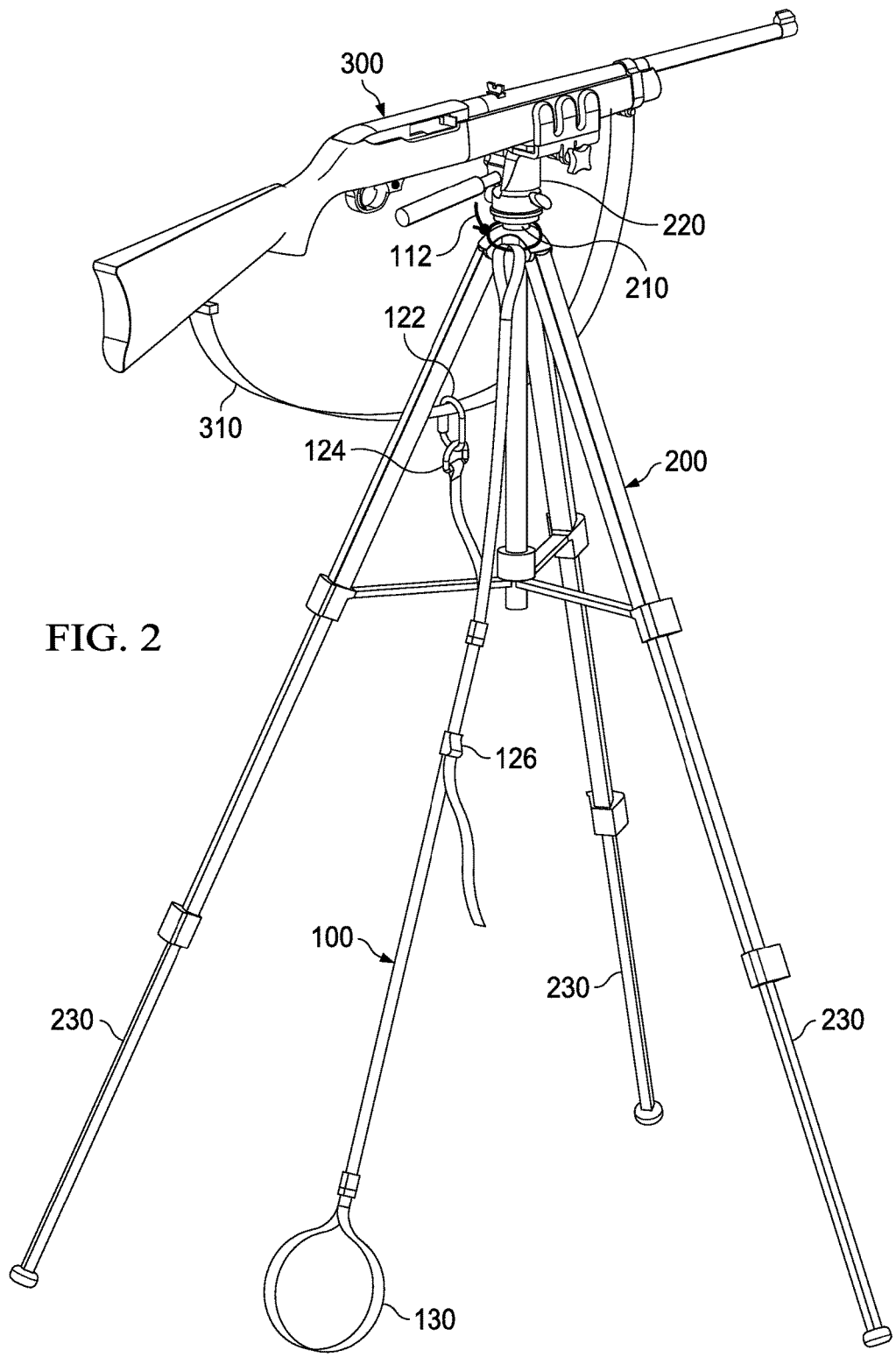
FIG. 2 illustrates a loop strap as used in connection with a rifle and a tripod shooting platform according to the present disclosure.

FIG. 2 depicts the loop strap 100 of FIG. 1 as used in connection with a tripod shooting platform 200 and rifle 300, which is detachably secured to tripod shooting platform 200 via rifle mount 220, according to the present disclosure. As shown in FIG. 2, loop strap 100 may be secured, via securing means 112, to a center or base 210 of the tripod shooting platform 200 underneath a rifle mount 220 on which is mounted rifle 300. Loop strap may further be coupled to a sling 310 of the rifle 300 via a second securing means comprising a D-ring 124 and carabiner 122 for enhanced stability, as shown in FIG. 2.

In operation, upper portion 110 of loop strap 100 may be secured to a tripod shooting platform 200 via securing means 112. Securing means 112 may be secured at the center or base 210 of the tripod platform 200 underneath its rifle mount 220, or at any other stabilizing position on the tripod platform 200. Next, the length of loop strap 100 may be adjusted via cam buckle 126. The length of loop strap 100 may be adjusted based on a user's shooting position, including but not limited to standing, sitting, or kneeling positions, as well as based on the user's height. Next, a user may engage loop 132 with his/her foot and pull down on loop strap 100 while in a shooting stance, thereby placing tension on the loop strap 100. This tension, in turn, results in the application of a compressive stabilizing force on tripod shooting platform 200, thereby reducing the amount of leg flex in the tripod legs 230 and substantially limiting movement of the tripod shooting platform 200. The greater the tension applied by the user via loop 132 on loop strap 100, the greater the compressive force that is applied to restrict the movement (i.e., by reducing the leg flex) of the tripod shooting platform 200.

Additionally, as described above, D-ring 124 of loop strap 100 may be attached to the sling 310 of a mounted rifle via carabiner 122. A user may pull down on the rifle sling 310 to exert an additional downward tension to the front of the rifle 300, thereby stabilizing the rifle and reducing recoil during discharge. While stabilization of the tripod shooting platform 200 and rifle 300 is optimized by use of D-ring 124 and carabiner 122, it may be noted that loop strap 100 may be used in various manners, alone or in combination with the rifle's sling 310, tripod platform 200, and/or other parts of the rifle and/or platform system to allow for uniform pressure and stabilization of the shooting platform 200.

After firing the rifle 300, the user may easily and quickly disengage from the shooting platform 200 by simply removing his/her foot from the loop 130. This is an improvement over prior art devices which require a user to unbuckle from the rifle's sling before disengaging.

It is to be understood that the implementations are not limited to particular apparatus or methods described which may, of course, vary. For example, the loop strap 100 need not be limited to the specific design or parts disclosed herein. Moreover, the invention defined by the above paragraphs is not to be limited to particular details set forth in the above description, as many apparent variations thereof are possible without departing from the spirit or scope of the present disclosure. It is also to be understood that the terminology used herein is for the purpose of describing particular implementations only and is not intended to be limiting.

The invention claimed is:

1. A loop strap for stabilizing a tripod shooting platform comprising:
   a first securing means for securing the loop strap to the tripod shooting platform;
   an adjustment means for adjusting a length of the loop strap;
   a second securing means for securing the loop strap to a firearm and stabilizing the firearm mounted on the tripod shooting platform; and
   a loop for engaging a user's foot and creating tension in the loop strap, thereby generating a compressive stabilizing force on the tripod shooting platform.

2. The loop strap of claim 1, wherein the first securing means is coupled to a base of the tripod shooting platform.

3. The loop strap of claim 1, wherein the adjustment means comprises:
   a cam buckle.

4. The loop strap of claim 1, wherein the adjustment means adjusts the length of the loop strap based on positioning of the user.

5. The loop strap of claim 1, wherein the adjustment means adjusts the length of the loop strap based on height of the user.

6. The loop strap of claim 1, wherein the second securing means comprises:
   a D-ring coupled to the adjustment means; and
   a carabiner for securing the D-ring to a sling of the firearm mounted on the tripod shooting platform.

7. The loop strap of claim 1, wherein the first securing means is selected from the group consisting of:
   a tying mechanism;
   at least one hook-and-loop fastener strap; and
   a snap closure.

8. An apparatus for stabilizing a tripod shooting platform comprising:
   an upper portion for securing the apparatus to the tripod shooting platform;
   a middle portion coupled to the upper portion and capable of being adjusted in size and further capable of securing the apparatus to a firearm and stabilizing the firearm mounted on the tripod shooting platform; and
   a lower portion for coupling to a user and for generating a stabilizing force on the tripod shooting platform.

9. The apparatus of claim 8, wherein the upper portion further comprises:
   a securing means for securing the apparatus to a base of the tripod shooting platform.

10. The apparatus of claim 8, wherein the middle portion comprises:
    a cam buckle;
    a D-ring coupled to the cam buckle; and
    a carabiner for securing the D-ring with a sling of the firearm mounted on the tripod shooting platform.

11. The apparatus of claim 8, wherein the lower portion comprises:
    a loop configured for placement of the user's foot.

12. A method of stabilizing a tripod shooting platform comprising:
    securing a first end of a loop strap to the tripod shooting platform;
    adjusting a length of the loop strap;
    pulling down on a second end of the loop strap to create tension in the loop strap, thereby generating a stabilizing force on the tripod shooting platform; and
    securing a third end of the loop strap to a firearm mounted on the tripod shooting platform, thereby stabilizing the firearm on the tripod shooting platform.

13. The method of claim 12, wherein the step of securing further comprises:
    securing the first end of the loop strap to a base of the tripod shooting platform.

14. The method of claim 12, wherein the step of adjusting further comprises:
    adjusting the length of the loop strap to conform to a height of a user.

15. The method of claim 12, wherein the step of adjusting further comprises:
    adjusting the length of the loop strap to conform to a position of the user.

16. The method of claim 12, wherein the second end of the loop strap comprises a loop.

* * * * *